(12) United States Patent
Hazen et al.

(10) Patent No.: US 10,807,399 B2
(45) Date of Patent: Oct. 20, 2020

(54) DIGITALLY RECEPTIVE COATING METHOD

(71) Applicants: John Hazen, South Hadley, MA (US); Larry Hoague, Feeding Hills, MA (US); Robert Zimmerman, Chicopee, MA (US)

(72) Inventors: John Hazen, South Hadley, MA (US); Larry Hoague, Feeding Hills, MA (US); Robert Zimmerman, Chicopee, MA (US)

(73) Assignee: HAZEN PAPER COMPANY, Holyoke, MA (US)

( * ) Notice: Subject to any disclaimer, the term of this patent is extended or adjusted under 35 U.S.C. 154(b) by 342 days.

(21) Appl. No.: 13/761,370

(22) Filed: Feb. 7, 2013

(65) Prior Publication Data

US 2013/0202897 A1 Aug. 8, 2013

Related U.S. Application Data

(60) Provisional application No. 61/595,791, filed on Feb. 7, 2012.

(51) Int. Cl.
*B41M 9/00* (2006.01)
*B41M 5/50* (2006.01)

(52) U.S. Cl.
CPC .............. *B41M 9/00* (2013.01); *B41M 5/502* (2013.01); *B41M 2205/28* (2013.01); *Y10T 156/10* (2015.01); *Y10T 428/31678* (2015.04)

(58) Field of Classification Search
None
See application file for complete search history.

(56) References Cited

U.S. PATENT DOCUMENTS

| | | | |
|---|---|---|---|
| 5,756,183 A | 5/1998 | Kutsch et al. | |
| 6,458,449 B1 * | 10/2002 | Parent et al. | 428/32.1 |
| 2003/0150550 A1 | 8/2003 | Weirather et al. | |
| 2004/0229004 A1 | 11/2004 | Spice et al. | |
| 2009/0133827 A1 | 5/2009 | Wozniak et al. | |

FOREIGN PATENT DOCUMENTS

WO WO2011109085 9/2011

OTHER PUBLICATIONS

International Search Report and Written Opinion, dated Feb. 7, 2013.

* cited by examiner

*Primary Examiner* — Cheng Yuan Huang
(74) *Attorney, Agent, or Firm* — Grogan, Tuccillo & Vanderleeden, LLP

(57) ABSTRACT

A digitally receptive coating method includes the steps of applying a digitally receptive coating to a first side of a film, metalizing the first side of the film and bonding the metalized first side of the film to a substrate to produce a laminate having a digitally receptive coating.

9 Claims, 2 Drawing Sheets

DIGITALLY RECEPTIVE COATING METHOD

CROSS-REFERENCE TO RELATED APPLICATIONS

This application claims the benefit of U.S. Provisional Application No. 61/595,791, filed Feb. 7, 2012, entitled "DIGITALLY RECEPTIVE COATING METHOD", hereby incorporated by reference in its entirety.

FIELD OF THE INVENTION

The present invention relates generally to a digitally receptive coating method and, more particularly, to a digitally receptive coating method using transfer lamination.

BACKGROUND OF THE INVENTION

Currently, a laminate is manufactured using a paper stock that has a clay coating on both the face and the back sides. The clays coating imparts certain desirable qualities to the paper such as surface gloss, smoothness and/or reduced ink absorbency. Such double coated papers are utilized in the packaging industry, for postcards, for advertising materials and in magazines.

As is currently known in the art, such a clay-coated laminate may be made using transfer lamination. Transfer lamination is a process by which a layer of material is applied to a substrate. Generally, transfer lamination involves bonding a transfer film having a application layer, e.g., a metalized layer, to a paper substrate, stripping the film from the substrate leaving the application layer, and then applying a coating to the layer to facilitate printing. As will be appreciated, this process typically involves multiple, separate steps.

In particular, an untreated film, such as a polyester film, that has a micro-embossable coating that has been micro-embossed and metalized is laminated to the face side of a clay-coated paper substrate using a water-based adhesive. The film layer is then stripped away, leaving the micro-embossable coating and metalizing on the face side surface. A digitally receptive coating is then applied to the laminated sheet.

A drawback to this method is that when the digitally receptive coating is applied to the front side of the laminate, the clay coating on the back side can "offset" or transfer to the front side of the laminate during storage. This is due in part to the paper laminate being wound up tightly in a roll after the digitally receptive coating is applied. In particular, as the finished laminate is being wound up into a roll, inter-layer slippage and/or rubbing between the front and back sides of the laminate may cause the clay coating on the back of the laminate to transfer to front of the laminate and adhere to the digitally receptive coating. Moreover, the digitally receptive coating on the front of the laminate is generally soft and acts like a quasi-adhesive under the tension of being wound in a roll, causing specs of the clay coating to pull from the back side of the laminate and stick to the digitally receptive coating on the front side. As a result, the digitally receptive coating may have specs of clay adhered thereto which can result in the finished laminate being "milky" or "hazy" in appearance.

In view of the above, it is desirable to produce a laminate wherein clay transfer and marring is minimized. Moreover, a need exists for a digitally receptive coating method which eliminates or reduces clay transfer. As discussed in detail herein, the present invention addresses these needs.

SUMMARY OF THE INVENTION

It is an object of the present invention to provide a digitally receptive coating method.

It is another object of the present invention to provide a digitally receptive coating method that utilizes transfer lamination.

It is another object of the present invention to provide a digitally receptive coating method whereby clay transfer is eliminated or reduced.

It is another object of the present invention to provide a digitally receptive coating method whereby a produced laminate may be stored in roll form without substantial clay transfer.

It is another object of the present invention to provide a digitally receptive coating method whereby the digitally receptive coating is substantially smooth as compared to existing methods.

It is another object of the present invention to provide a digitally receptive coating method in which a digitally receptive coating is applied to a transfer film.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 1:
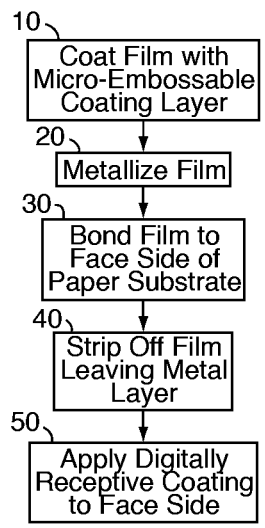
FIG. 1 is a flowchart illustrating a prior art method for transfer lamination.
Figure 2:
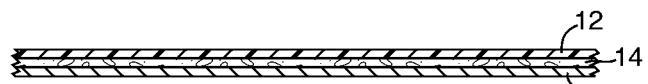
FIG. 2 is an illustration of a prior art transfer film construction.

Referring to FIGS. 1 and 2, known processes for producing a clay-coated laminate having a digitally receptive coating for digital printing involve the following general steps. The first of these steps, labeled with reference numeral 10, is to coat an untreated polyester film 12 with a micro-embossable coating layer 14. The film 12 is then either metalized, as shown at step 20, or micro-embossed and then metalized. The step of metallization involves placing the film 12 in a large metalizer where metals, such as aluminum 16, are vacuum deposited or deposited by other means known in the art, on the film 12. The construction of the transfer film after metallization is shown in FIG. 2. As shown therein, subsequent to metallization, the transfer film includes an untreated polyester film 12, a micro-embossable coating layer 14, and a metal layer 16.

Once the film has been metalized, it is bonded to a paperboard substrate 18 in a third step, represented by reference numeral 30. In this step, a water-based adhesive 22 is applied to the film and the film is laminated to the face side of a paperboard substrate 18 (having a clay coating on both sides). Alternatively, the adhesive 22 may be a solvent-based adhesive, energy curable adhesive, or other type of adhesive known in the art, without departing from the broader aspects of the present invention.

Figure 3:
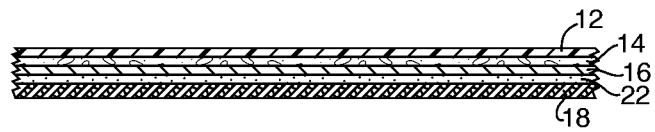
FIG. 3 is an illustration of a prior art laminate construction at a point prior to removing the transfer film.

The construction of the laminate following step 30 is shown in FIG. 3. As shown therein, the construction includes a paperboard substrate 18 with a clay coating on both the face and back sides, a water-based adhesive layer 22, a metal layer 16, a micro-embossable coating layer 14 and the untreated polyester film 12 forming the top layer.

As shown in step 40, the polyester film 12 is then stripped off, leaving the thin metal layer 16 bonded to the paper substrate 18. At step 50, a digitally receptive coating 24 is then applied to the face side of the laminate. This digitally receptive coating allows for digital printing, such as text, designs, pictures or the like, on the laminate. This process is described in further detail in U.S. Patent Application Publication No. 2010/0314036, which is hereby incorporated by reference herein in its entirety.

Figure 4:
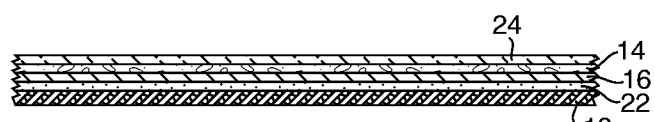
FIG. 4 is an illustration of a prior art laminate construction after the film has been removed and a digitally receptive coating applied.

As shown in FIG. 4, once the polyester film 12 is stripped off and the digitally receptive coating applied, the finished laminate construction includes a paperboard substrate 18 with a clay coating on both the face and back sides, a water-based adhesive layer 22, a metal layer 16, a micro-embossable coating layer 14 and a digitally receptive coating 24 on top.

As discussed above, however, this process may be problematic, especially when the laminate is wound into a roll for storage and the like. In particular, the digitally receptive coating 24 may be sensitive to excessive pressure such that when the finished laminate is would up tightly in a roll, the digitally receptive coating 24 may adhere slightly to the clay coated back of the laminate and cause an effect known as "offsetting," where part of the clay coating transfers to the digitally receptive coating 24, causing an unsightly, "hazy" look. Rolls of laminate produced by this method, therefore, must be sheeted immediately to minimize this effect.

Figure 5:
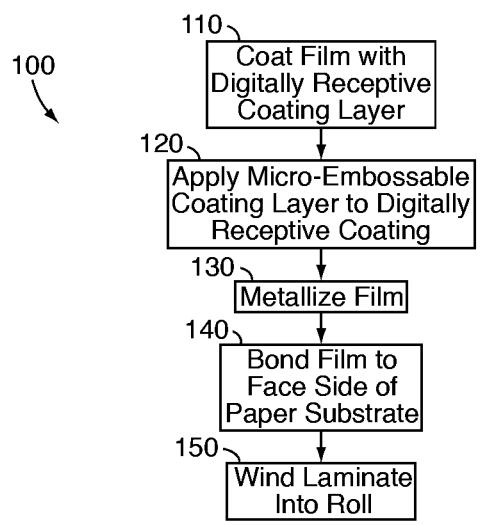
FIG. 5 is a flowchart illustrating a digitally receptive coating method in accordance with an embodiment of the present invention.

Turning now to FIG. 5, the inventive digitally receptive coating method 100 of the present invention substantially eliminates offsetting, leaving the digitally receptive coating 24 with a smooth and mirror-like finish. The method 100 includes first coating an untreated polyester film 12 with a digitally receptive coating layer 24. This step is represented by reference numeral 110. In the preferred embodiment, the digital coating 24 is applied at a coat weight of approximately 0.15 to 0.40 dry pounds per 3000 square feet. Next, a micro-embossable coating layer 14 is applied to the digitally receptive coating 24, as shown at step 120. In the preferred embodiment, the micro-embossable coating layer 14 is applied at a coat weight of 0.7-1.5 dry pounds per 3000 square feet, although other coat weights are certainly possible without departing from the broader aspects of the present invention. The film is then either metalized, as shown at step 130, or micro-embossed and then metalized. In an embodiment, metallization involves depositing a thin layer of aluminum on the micro-embossable coating layer 14.

Figure 6:
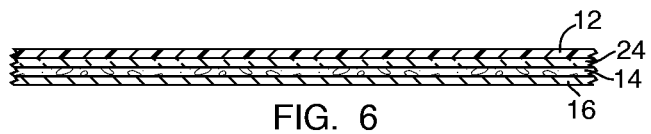
FIG. 6 is an illustration of a transfer film construction in accordance with an embodiment of the present invention.

At this point in the process, the transfer film construction includes the untreated polyester film 12, a digitally receptive coating layer 24, a micro embossable coating layer 14 and a metal layer 16. Importantly, the digitally receptive coating layer is actually applied to the untreated polyester film 12, not the finished laminate, and is intermediate the metal layer and the untreated polyester film 12. This construction is illustrated in FIG. 6.

Once the film has been metalized, it is bonded to a paperboard substrate 18 in a fourth step, represented by reference numeral 140. In this step, a water-based adhesive 22 is applied to the transfer film construction and then the transfer film construction is then laminated to the face side of a paperboard substrate 18 (having a clay coating on both sides). Importantly, the resulting laminate remains in this state until it is ready to be sheeted, at which time the polyester film 12 is stripped/removed. After laminating the transfer film construction to the paper substrate 18, the laminate, including the polyester film 12, can be wound into a roll for storage, as shown at step 150.

Figure 7:
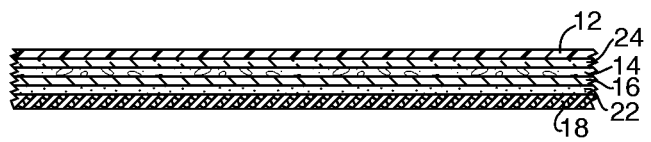
FIG. 7 is an illustration of a laminate construction in accordance with an embodiment of the present invention.

As will be readily appreciated, after adhering the transfer film to the paperboard substrate 18, the laminate construction includes a paperboard substrate 18 with a clay coating on both the face and back sides, a water-based adhesive layer 22, a metal layer 16, a micro-embossable coating layer 14, a digitally receptive coating layer 24 and the untreated polyester film 12 forming the top layer. This construction is shown in FIG. 7. Importantly, the untreated polyester film 12 is left on top of the laminate and serves to protect the digitally receptive coating 24. In particular, when the finished laminate is would into a roll, the polyester film 12 serves as a buffer between the "soft" and "sticky" digitally receptive coating layer 24 and the clay-coated back side of the paperboard 18. In this manner, the polyester film 12 prevents the digitally receptive coating 24 from contacting the clay-coated back side of the paperboard substrate 18 while in roll form.

Moreover, because the digitally receptive coating 24 is applied to the untreated polyester film 12 prior to laminating the film to the paperboard 18 (rather than applying it to the laminate as a final step), the polyester film 12 may be left on the laminate, rather than stripped off, until just prior to sheeting. As noted above, the laminate may then be wound tightly in a roll and stored without the clay transfer issue that has hampered prior methods.

When the finished laminate is sheeted, the polyester film 12 is finally stripped off. The laminate is then sheeted and stacked. As will be readily appreciated, the interlay pressure is less in sheeted form than in roll form, so the offsetting or clay transfer is minimized or eliminated.

In addition to eliminating the clay transfer issue, waste associated with known processes is reduced. Furthermore, the finished surface of the digitally receptive coating 24 is much smoother as compared to the finished surface of the laminate manufactured utilizing known processes. This is a result the fact that the polyester film 12 to which the digitally receptive coating 24 is applied during the inventive method 100 is much smoother than micro-embossable coating layer 14 to which the digitally receptive coating 24 has been applied in existing processes. The method of the present invention also is more environmentally friendly than existing methods, as once the polyester film 12 is finally stripped, the produced laminate is easier to recycle.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A laminate construction, comprising:
   a paperboard substrate, said paperboard substrate having a clay coating on a face side and back side thereof;
   an adhesive layer on said face side of said paperboard substrate;
   a metal layer in contact with said adhesive layer;
   a micro-embossable coating layer adjacent to said metal layer;
   a digitally receptive coating layer adjacent to said micro-embossable coating layer; and
   a transfer film adjacent to said digitally receptive coating layer, the transfer film having a surface that is smoother than a surface of the micro-embossable coating layer, and which imparts a correspondingly smooth surface to the digitally receptive coating layer;
   wherein said transfer film is removable from said digitally receptive coating layer so as to expose said smooth surface of said digitally receptive coating layer before said laminate construction is sheeted.

2. The laminate construction of claim 1, wherein:
   said digitally receptive coating layer has a coat weight of approximately 0.15 to 0.40 dry pounds per 3000 square feet.

3. The laminate construction of claim 1, wherein:
   said micro-embossable coating layer has a coat weight of approximately 0.7 to 1.5 dry pounds per 3000 square feet.

4. The laminate construction of claim 1, wherein:
   said transfer film is a polyester transfer film.

5. The laminate construction of claim 1, wherein:
   said laminate construction is wound into a roll such that said clay coating on said back side of said substrate is in contact with said film.

6. The laminate construction of claim 1, wherein:
   the transfer film is non-porous.

7. The laminate construction of claim 1, wherein:
   the digitally receptive coating layer is a single layer.

8. The laminate construction of claim 1, wherein:
   the metal layer is in direct contact with the adhesive layer.

9. A laminate construction, comprising:
   a transfer film;
   a digitally receptive coating applied to the transfer film; and
   a micro-embossable coating layer and/or a metal layer applied to the digitally receptive coating;
   wherein application of said digitally receptive coating to said transfer film imparts a corresponding smoothness to said digitally receptive coating at a surface of said digitally receptive coating that contacts said transfer film; and
   wherein said transfer film is removable from said digitally receptive coating utilizing a transfer lamination stripping process to expose said surface of said digitally receptive coating.

* * * * *